United States Patent [19]

Brodie et al.

[11] 3,933,551
[45] Jan. 20, 1976

[54] STABILIZATION OF TREAD STRIP DURING BONDING TO TIRE

[75] Inventors: Edwin T. Brodie; Ronald Seiler, both of Muscatine, Iowa

[73] Assignee: Bandag Incorporated, Muscatine, Iowa

[22] Filed: Nov. 30, 1973

[21] Appl. No.: 420,577

[52] U.S. Cl. .......... 156/96; 156/128 R; 156/394 FM
[51] Int. Cl.² ...................... B29H 5/04; B29H 17/36
[58] Field of Search......... 156/128, 394, 394 FM, 96

[56] References Cited
UNITED STATES PATENTS

| | | | |
|---|---|---|---|
| 3,558,383 | 1/1971 | Lejeune | 156/96 |
| 3,779,830 | 12/1973 | Reppel | 156/96 |
| 3,802,978 | 4/1974 | Barnett | 156/128 |
| R15,120 | 6/1921 | Pfeiffer | 156/96 |

FOREIGN PATENTS OR APPLICATIONS

| | | | |
|---|---|---|---|
| 555,690 | 9/1943 | United Kingdom | 156/96 |

*Primary Examiner*—Clifton B. Cosby
*Attorney, Agent, or Firm*—Cushman, Darby & Cushman

[57] ABSTRACT

In bonding a prevulcanized tread strip to a tire casing with a low-temperature-vulcanizable bonding medium temporary support elements in the form of elastic rings are inserted in the circumferential tread grooves during pressing of the tread strip against the tire casing for the purposes of achieving uniform pressure over the whole tread strip and preventing distortion or movement of portions of the tread strip and/or bonding medium during the bonding operation.

4 Claims, 2 Drawing Figures

STABILIZATION OF TREAD STRIP DURING BONDING TO TIRE

BACKGROUND OF THE INVENTION

This invention relates to methods and apparatus for bonding a prevulcanized rubber tread strip to the circumference of a tire casing. In particular it relates to improved methods and apparatus for obtaining a uniform bond over the entire contact area between the tread strip and the tire casing and for preventing distortion or unwanted movement of a portion of the tread strip and/or bonding medium during the bonding operation.

In recent years it has become conventional to retread a worn tire casing by bonding to the circumference thereof a prevulcanized profiled tread strip by means of rubber-base bonding materials which can be vulcanized rather rapidly at relatively low temperature. The bonding technique is also suitable for making new tires from newly manufactured tire casings having no tread on their circumferences. In either case the technique includes the step of pressing or forcing the tire casing and tread strip together while applying vulcanizing heat to the bonding medium, and in order to obtain a satisfactory bond it is always necessary to avoid the presence of air between the tread strip and tire casing. Removal of air is most readily effected by covering the tread strip and at least the adjacent side walls of the tire casing with a flexible impervious cover or envelope, sealing the cover to the tire and effecting a differential pressure between the interior and exterior of the cover as by applying fluid pressure to the exterior of the cover or applying a vacuum to the space between the cover and the assembly of tire casing and tread strip or a combination of both fluid pressure and vacuum applied sequentially or simultaneously. In either case the air is exhausted through a suitable conduit which is in communication at one end with the space. The pressing and vulcanizing operation may be carried out using the same fluid pressure differential technique or by means of mechanical pressure. Examples of different air expulsion and/or pressing operations are more fully described in U.S. Pat. Nos. 2,976,910 (Nowak), 3,236,709 (Carver), 3,325,326 (Schelkmann), 3,752,726 (Barefoot), and 3,745,084 (Schelkmann).

It has been recognized, for example, in the aforenoted U.S. pat. Nos. 3,325,326 and 3,745,084 that the pressing together of the tread strip and tire casing may sometimes produce variations in the pressure being applied at different locations, with the result that the bonding medium and/or the tread are distorted or shifted during bonding. The resulting product may be unsatisfactory in having a nonuniform bond between tread and tire casing or in having other defects. The problem is thought to arise because pressure is exerted by whatever pressing element is used only on the outer surfaces of the tread profiles. In spite of the air removal operation some air may remain in the tread profiles with a resulting reduction in the pressure transmitted to those portions of the tread strip and those portions of bonding material lying directly below the circumferential tread grooves. The solution proposed by U.S. Pat. 3,325,326 is to first apply a vacuum inside the envelope and fluid pressure to the exterior of the envelope and then increase the pressure inside the envelope. The solution proposed by U.S. Pat. No. 3,745,084 is to assure that the envelope penetrates to the bottom of the grooves.

SUMMARY OF THE INVENTION

The present invention overcomes the problem of unequal pressure distribution in and on the tread strip and bonding medium by inserting temporary pressure transmitting members, or support members into the circumferential tread grooves during the pressing and bonding operation. The support members are preferably in the form of elastic rings or endless ribs each of which engages the bottom and sides of its respective grooves so as to substantially fill the groove. It has been found that the resilient material of the support members positively transmits the presence of the pressing element to the bottom and sides of the groove to distribute the pressure evenly.

Specifically it has been found that the presence of the rings during pressing and bonding are very effective to transmit the radial pressure of the pressing element evenly to the tread and bonding medium, to avoid the formation of thick and thin areas of bonding medium, to stabilize the tread strip against distortion of the tread ribs and the undertread portions under the grooves, and to prevent lateral displacement of the tread strip itself. A further advantage of the rings relates to the splice which is normally present between the two ends of the tread strip. The splice is usually made by placing bonding medium between the two ends of the tread strip as it is wrapped around the tire casing. During the pressing operation this bonding medium is compressed between the two ends of the tread strip, and when the envelope does not extend to the bottom of the tread groove some of this bonding medium may be forced radially outward into the groove where it cures and forms a dam which may completely fill the cross section of the groove at the location of the splice. The rings, in transmitting pressure to the splice area, prevents the formation of dams by forcing any displaced bonding medium against the bottom of the grooves so as to form thin layers.

The rings are particularly useful during bonding of tread strips which have been slit with a large number of closely spaced parallel cuts extending across the tread at an angle to the tread grooves. These slits or cuts penetrate radially into the tread ribs whereby each rib is divided into a large number of small separate tread elements which enhance the gripping power of the tread during road use. These tread elements, and consequently, the undertread portion of the tread strip are rather easily deflected or distorted during the pressing and bonding operation, but it has been found that the rings of this invention are very effective in supporting or stabilizing the elements. The slitting of tire treads to improve performance is, broadly, a well-known technique as disclosed, for example, in U.S. Pat. No. 2,863,507 (Meserve et al).

In its preferred form the invention contemplates that the rings be inserted into the tread grooves prior to the conventional stitching operation. Stitching is the term applied to the step of applying a roller or rollers to the circumference of the assembly of tire casing, bonding medium and initially wrapped tread strip while rotating the assembly in order to provide initial adhesion of the tread strip to the tire casing prior to applying an envelope to the assembly. By inserting the rings prior to the stitching operation the rings become firmly seated in the tread grooves by the action of the stitching roller, inasmuch as the latter presses against the outer surface of the tread strip with sufficient force to temporarily deflect the tire casing radially inwardly.

The support members may be employed in any type of bonding operation involving the pressing of a tread strip against the tire casing by a flexible pressing element such as an envelope or by a solid pressing element such as smooth rigid mold members or a flexible metal band. The support members have particular advantage in the envelope type of operation, because it has been found that it is very seldom possible to force the envelope completely into the tread grooves due to the thickness of the envelope which is required for strength and durability. The envelope may penetrate part way into the grooves, and, therefore, the support members need not always completely fill the grooves. The members need only substantially fill the grooves and by this is meant that the envelope will tightly engage the outwardly facing surfaces of the member so that the pressure exerted by the envelope will be transmitted to the bottom of the grooves.

The preferred form of support members are resilient rubber rings capable of substantial elastic extension, each ring being formed from a length of rubber stock by stapling or splicing or otherwise securing the ends of the length together. Preferably the rings have circumference less than the circumference of the tire and tread assembly so that they may be inserted into the tread grooves by stretching them over the circumference of the assembly and then allowing them to contract so as to fit snugly into the tread grooves, or at least to lie in the upper portion of the grooves so that they can then be pressed completely into the grooves. The flexibility of the rings is such that they follow the normal serpentine or zig-zag shape of the grooves.

The cross sectional shape of a ring may be circular or other shape, it being only necessary that the flexibility and resilience of the material of the ring be such that the ring generally conforms to the shape of the groove when pressure is applied to the outer surface of the ring. It is important, however, that the ring have a width dimension which will permit easy insertion of the ring into the groove and subsequently provide support for the tread profiles when pressure is being applied. In the relaxed condition the ring may have a width dimension of 80 – 100% of the groove width. The height dimension of the ring may be 50 – 100% of the groove depth. As an example, a 0.250 inch diameter ring is appropriate for a passenger tread having a groove width of 0.250 inch to 0.300 inch and a groove depth of 0.4375 inch.

The rings may be of solid or tubular cross section, and if tubular they may be inflatable so that upon introduction of fluid pressure they expand into even tighter engagement with the sides and bottom of the tread grooves. The rings may also take the form of spaced apart ribs projecting from a common thin web which in the operative position of the rings will overlie the outermost surfaces of the tread ribs.

DETAILED DESCRIPTION

Figure 1:
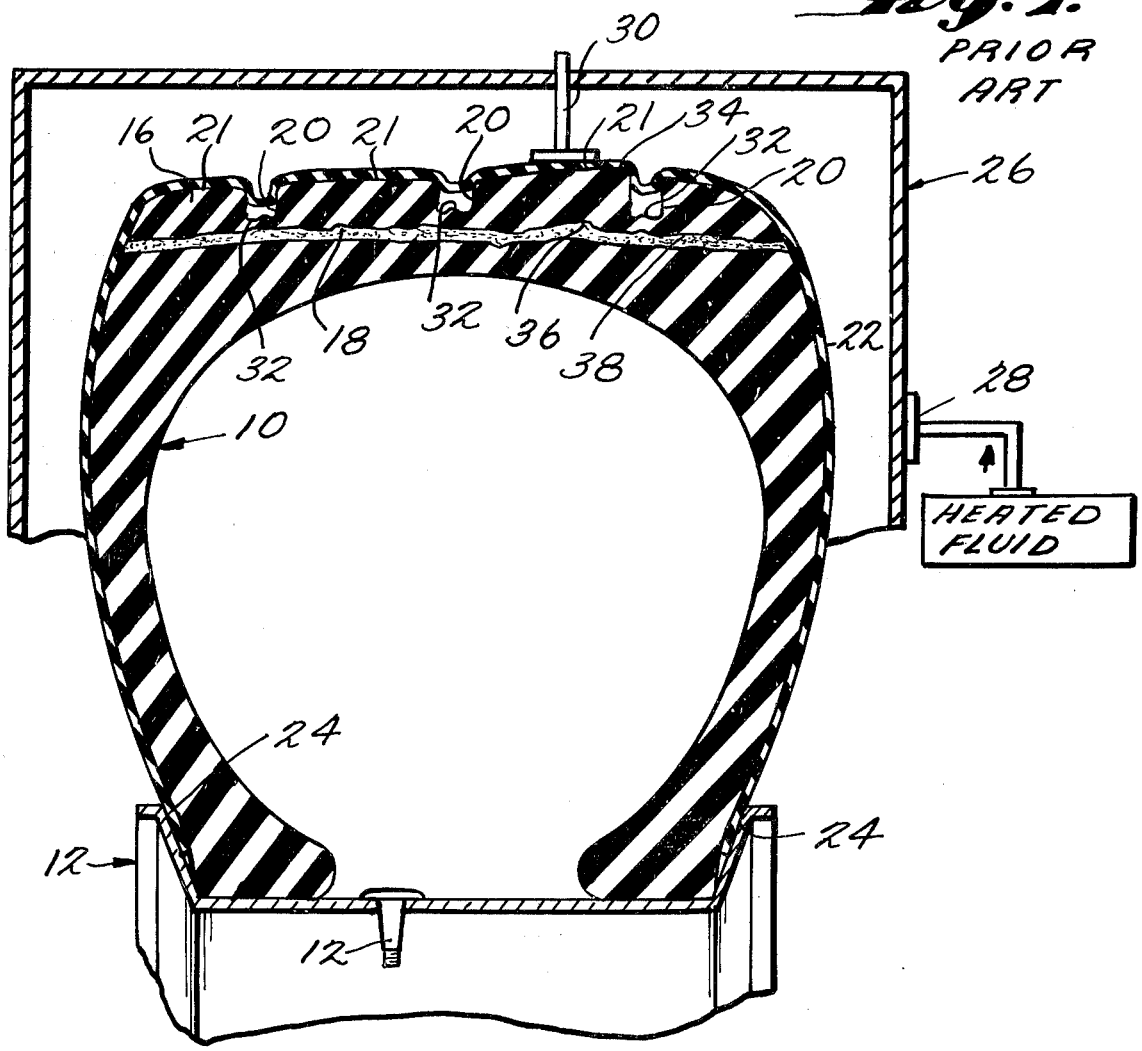
FIG. 1 is a schematic sectional view of a tire and tread assembly being bonded together by a prior art method and illustrating in exaggerated form some of the distortion problems which may arise.

FIG. 1 illustrates in schematic form a bonding operation being carried out by the technique disclosed in the aforenoted U.S. Pat. No. 3,236,709 and showing in exaggerated form some of the problems which can arise as a result of nonuniform distribution of pressure on the tread strip. There is shown a tire casing 10 mounted on a rim 12 so as to be inflatable with air or other fluid through a suitable valve 14. A prevulcanized tread strip 16 has been wrapped around the circumference of the tire casing 10 with a bonding medium 18 interposed between the two. The bonding medium 18 may be any suitable rubber base composition which is capable of self-vulcanization at elevated temperature and capable of forming a bond between the tread strip 16 and the tire casing 10. Preferably the bonding medium 18 is vulcanizable at temperatures between about 190°F. and 250°F. The tread strip 16 has been prevulcanized under high pressure and as shown includes conventional grooves 20 and ribs 21 each of which extends continuously around the circumference.

Overlying the tread strip 16 and the side walls of the tire casing 10 is a pressing element in the form of a flexible rubber annular envelope 22 which extends around the circumference of the tire and tread assembly. The edges of the envelope 22 are temporarily sealed to the side walls of the tire casing 10, as by being clamped at 24 between the side walls and the rim 12. The entire assembly of rim 12, tire casing 10, tread strip 16, bonding medium 18 and envelope 22 is disposed in a vessel 26 such as an autoclave. In order to press the tread strip 16 against the circumference of the tire casing 10 and vulcanize the bonding medium 18 heated fluid such as a mixture of steam and air is injected into the vessel 26, a suitable connection 28 being provided in the wall of the vessel 26 for this purpose. The pressure should be no greater than the inflating pressure in the tire casing 10 so that the latter will not be deformed. Usually the tire casing will be inflated to about normal road pressure, and the autoclave pressure will be somewhat less.

The space between the inside surface of the envelope 22 and the assembly of tire and tread strip is in communication with the atomosphere outside the vessel 26 as by means of a conduit 30 connected to the envelope 22. The fluid pressure in the autoclave thereby presses the envelope 22 in tight contact with the assembly and forces the tread strip 16 against the circumference of the tire casing 10, the air in the envelope 22 being forced out through the conduit 30.

The thickness and flexibility of the envelope 22 and the width of the tread grooves 20 are such that normally the envelope 22 cannot penetrate to the bottom of the grooves, as shown in FIG. 1, even though this would be desirable. Instead the envelope 22 will normally penetrate only part way into the grooves 20 with the results that air will be trapped in the grooves 20 and that there is less force at the bottoms of the grooves 20 and less pressing of those portions of the tread strip 16 against the tire casing. This alone may produce a weaker bond under the grooves 20. At the same time there is maximum force being applied on the outer surfaces of the tread ribs 21 without there being any support for the sides of the ribs 21. The overall result of this state of nonuniform pressure being exerted on the tread strip 16 is that several forms of distortion of the latter and of the bonding medium 18 may occur. One form of distortion is that the undertread portions of the tread strip may become humped, as shown at 32 in exaggerated form. Also, the individual tread ribs 21 may pitch or tilt as shown at 34. Further, the bonding medium 18 may become distorted into thick and thin portions 36 and 38 from movement of the individual ribs 21 or from lateral movement of the entire tread strip 16. Still further, as explained above but not shown in the drawing, bonding material from the spliced ends of the tread strip 16 may form a dam across one or more of the grooves 20.

Figure 2:
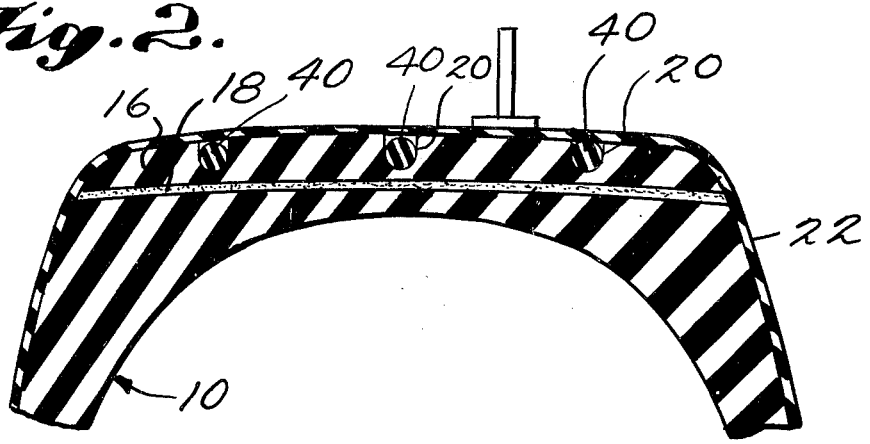
FIG. 2 is a schematic fragmentary view of a tire and tread assembly being bonded together using the method and apparatus of the present invention.

FIG. 2 illustrates how these defects are avoided by the presence of support or stabilizing members in the grooves 20 during the pressing and bonding operation. In the illustrated embodiment the support members are resilient flexible elastic O-rings 40 which have been inserted into the grooves 20. The material of the rings 40 may be neoprene or other age resisting rubber having as original properties a tensile strength of at least 100 psi, 270° elongation and 60 ± 3 Shore A Durometer and having aged properties after 8 days at 230°F. of 70 psi tensile strength, 70% elongation and 72 ± Shore A Durometer. In a relaxed condition the rings 40 should have a circumference of about 75% of the circumference of the assembly of tire casing and tread strip.

The rings 40 are inserted in the grooves 20 by stretching them over the circumference of the tire and tread assembly and pressing them into the grooves 20 prior to enclosing the assembly in the envelope 22. It is preferred that the insertion step be carried out simultaneously with stitching the tread strip 16 to the tire casing 10 because this assures that each ring 40 will be properly seated in the bottom of its groove before the envelope 22 is applied.

As shown in FIG. 2 each ring 40 should fit snugly in its groove 20 so as to be in contact with the bottom and at least a substantial portion of the side wall of the groove 20. The envelope 22 contacts the outer surface of the rings 40 so that autoclave pressure is transmitted to the undertread portions of the tread strip 16 directly below the grooves 20. At the same time the tread ribs are supported against lateral distortion. The result is that all portions of tread strip are pressed against the circumference of tire casing 10 at essentially the same pressure, and there is no distortion of the bonding medium 18, the undertread or the tread ribs 21.

What is claimed is:

1. In the method of bonding the circumference of a tire casing to a prevulcanized rubber tread strip having a continuous undertread portion integral with tread ribs which are spaced apart by grooves by interposing a cold-vulcanizable bonding medium between the tread strip and the tire casing, engaging the outer surface of the tread ribs with a pressing element which is essentially free of engagement with the surfaces of the grooves and forcing the pressing element simultaneously against the entire outermost surface of the tread ribs in order to press the tread strip against the tire casing and to expel entrapped air from between the tread strip and the tire casing, while heating the bonding medium to effect vulcanization thereof, the improvement which comprises placing in at least one of the tread grooves a temporary pressure-transmitting support member which engages the bottom and at least a substantial portion of the side wall of the groove and which extends at least a major proportion of the length of the groove, thereafter effecting the engagement of the outer surface of the tread ribs with the pressing element, said temporary support member being engaged by the pressing element and transmitting the pressing action of the pressing element to the bottom wall of the groove so as to aid in applying pressure uniformly over the undertread portion of the tread strip, and thereafter removing said pressing element and said support member.

2. Apparatus for bonding a prevulcanized grooved and ribbed tread strip to the circumference of a tire casing by means of a vulcanizable bonding medium interposed between the tread strip and the tire casing comprising resilient elastic rings insertable within the grooves of the tread strip so as to engage the bottom and side walls of the grooves pressing means for applying radial inward pressure simultaneously over the entire outermost surfaces of the tread ribs and to the radially outermost surfaces of the resilient elastic ring means whereby substantially uniform pressure is applied to all portions of the tread strip and to the bonding medium and whereby the tread strip and bonding medium are stabilized against distortion and movement during application of pressure, and means for applying vulcanizing heat to the bonding medium during the application of pressure.

3. Apparatus as in claim 2 wherein said rings are rubber rings which are extensible to at least twice their relaxed circumference.

4. Apparatus as in claim 3 wherein said pressing means includes a flexible fluid impervious envelope.

* * * * *